United States Patent
Onagawa

(10) Patent No.: US 6,806,914 B1
(45) Date of Patent: Oct. 19, 2004

(54) METHOD AND APPARATUS FOR CHANGING THE SIZE OF IMAGE

(75) Inventor: Seiki Onagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 260 days.

(21) Appl. No.: 09/695,033

(22) Filed: Oct. 25, 2000

(30) Foreign Application Priority Data

Oct. 25, 1999 (JP) ............................................. 11-302247

(51) Int. Cl.$^7$ .......................... H04N 7/01; H04N 5/262
(52) U.S. Cl. ........................ 348/581; 348/445; 348/446
(58) Field of Search ................................. 348/581, 580, 348/561, 441, 448, 458, 445, 567, 704; 345/660, 667, 670–1, 668; 382/298–300

(56) References Cited

U.S. PATENT DOCUMENTS

| | | | | |
|---|---|---|---|---|
| 4,872,054 A | * | 10/1989 | Gray et al. ................. | 348/441 |
| 5,014,129 A | * | 5/1991 | Imanishi ..................... | 348/581 |
| 5,070,403 A | * | 12/1991 | Wilkinson ............. | 375/240.14 |
| 5,534,934 A | * | 7/1996 | Katsumata et al. ......... | 348/445 |
| 5,555,027 A | * | 9/1996 | Takeuchi .................... | 348/581 |
| 5,600,347 A | * | 2/1997 | Thompson et al. ......... | 345/667 |
| 5,739,867 A | * | 4/1998 | Eglit ........................... | 348/581 |
| 5,790,714 A | * | 8/1998 | McNeil et al. .............. | 382/300 |
| 5,963,261 A | * | 10/1999 | Dean .......................... | 348/446 |
| 6,151,079 A | * | 11/2000 | Nagata et al. ............... | 348/581 |
| 6,191,820 B1 | * | 2/2001 | Kang et al. .................. | 348/445 |
| 6,239,847 B1 | * | 5/2001 | Deierling .................... | 348/581 |
| 6,380,979 B1 | * | 4/2002 | Tokoi et al. ................. | 348/458 |
| 6,389,180 B1 | * | 5/2002 | Wakisawa et al. .......... | 382/298 |
| 6,407,775 B1 | * | 6/2002 | Frink et al. ................. | 348/443 |
| 6,441,863 B1 | * | 8/2002 | Miyazaki et al. ........... | 348/567 |
| 6,476,868 B1 | * | 11/2002 | Kaji et al. ............. | 348/333.12 |
| 6,501,484 B1 | * | 12/2002 | Porter ......................... | 345/667 |
| 6,522,362 B1 | * | 2/2003 | Nakamoto et al. .......... | 348/447 |

FOREIGN PATENT DOCUMENTS

| | | |
|---|---|---|
| JP | 9-326958 | 12/1997 |
| JP | 11-25265 | 1/1999 |
| JP | 2000-082136 | 3/2000 |
| JP | 2000-207391 | 7/2000 |
| JP | 2000-350016 | 12/2000 |

\* cited by examiner

*Primary Examiner*—Michael H. Lee
*Assistant Examiner*—Paulos Natnael
(74) *Attorney, Agent, or Firm*—Foley & Lardner LLP

(57) ABSTRACT

An image size changing apparatus has a relatively smaller circuitry arrangement for producing a size changed image which exhibits minimum artifacts such as foldover. The image size changing apparatus of the present invention allows image data to be interpolated with a ratio between a visual area determined by pixel data DS0, DS1, and DS2 of an original image and a visual area determined by pixel data DD0 and DD1 of its size changed image, hence yielding the size changed image with less artifacts such as foldover in its relatively smaller circuitry arrangement.

8 Claims, 16 Drawing Sheets

$$DD0 = \frac{DS0 \times 2/2 + DS1 \times 1/2}{3/2}$$

$$DD1 = \frac{DS1 \times 1/2 + DS2 \times 2/2}{3/2}$$

| DS0 | DS1 | DS2 |
|---|---|---|

| DD0 | DD1 | DD2 | DD3 |
|---|---|---|---|

$$DD0 = \frac{DS0 \times 3/4}{3/4}$$

$$DD1 = \frac{DS0 \times 1/4 + DS1 \times 2/4}{3/4}$$

$$DD2 = \frac{DS1 \times 2/4 + DS2 \times 1/4}{3/4}$$

$$DD3 = \frac{DS2 \times 3/4}{3/4}$$

FIG.9

| DS0 | DS1 | DS2 | DS3 | DS4 | DS5 | DS6 | DS7 |
|---|---|---|---|---|---|---|---|

| DD0 | DD1 | DD2 | DD3 | DD4 |
|---|---|---|---|---|

$$DD0 = \frac{DS0 \times 5/5 + DS1 \times 3/5}{8/5}$$

$$DD1 = \frac{DS1 \times 2/5 + DS2 \times 5/5 + DS3 \times 1/5}{8/5}$$

$$DD2 = \frac{DS3 \times 4/5 + DS4 \times 4/5}{8/5}$$

$$DD3 = \frac{DS4 \times 1/5 + DS5 \times 5/5 + DS6 \times 2/5}{8/5}$$

$$DD4 = \frac{DS6 \times 3/5 + DS7 \times 5/5}{8/5}$$

FIG.10

$DD0 = DS0$ $DD1 = DS1 \times 0.5 + DS2 \times 0.5$ $DD2 = DS3$ $DD3 = DS4 \times 0.5 + DS5 \times 0.5$ $DD0 = DS0 \times 3/4 + DS1 \times 1/4$ $DD1 = DS1 \times 1/4 + DS2 \times 3/4$ $DD2 = DS3 \times 3/4 + DS4 \times 1/4$ $DD3 = DS4 \times 1/4 + DS5 \times 3/4$

METHOD AND APPARATUS FOR CHANGING THE SIZE OF IMAGE

BACKGROUND OF THE INVENTION

The present invention relates to a method and an apparatus for changing the size of image data.

It is common for changing the size of image data of an original image to interpolate the image data with the use of interpolation factors determined by the relative distance between the location of pixel data of one field of the original image and the location of pixel data of its size changed image.

A conventional image size changing apparatus employs a known technique of using the fraction of accumulation of an inverse of the size change rate as the interpolation factors (See Japanese Patent Application Laid-open 9-326958). FIG. 15 is a block diagram showing an arrangement of the conventional apparatus.

The conventional apparatus comprises, as shown in FIG. 15, a divider 100 for dividing pixels of the original image and pixels of its size changed image, a horizontal interpolation factor generator circuit 101 for accumulating outputs of the divider 100 at timing of a sampling clock signal and calculating a horizontal interpolation factor from a result of the accumulation, a vertical interpolation factor generator circuit 102 for accumulating outputs of the divider 100 at timing of a horizontal frequency clock signal and calculating a vertical interpolation factor from a result of the accumulation, an address generator circuit 103 responsive to the integer of the accumulation outputs of the horizontal interpolation factor generator circuit 101 and the vertical interpolation factor generator circuit 102 for generating address data used for reading desired data from a memory, the memory 104 for storage of image data of one field of the original image, a pair of inverters 105 and 106 for inverting the interpolation factors from the horizontal 101 and the vertical interpolation factor generator circuit 102 to yield 1-p and 1-q respectively based on 1, a group of multipliers 107, 108, 109, and 10a for multiplying the interpolation factor from the horizontal interpolation factor generator circuit 101 and the interpolation factor from the vertical interpolation factor generator circuit 102 by each other, another group of multipliers 10b, 10c, 10d, and 10e for multiplying the pixel data of one field of the original image received from the memory 104 by the interpolation factors received from the multipliers 107, 108, 109, and 10a respectively, a couple of adders 10f and 10g for summing the outputs of the multipliers 10b and 10c and the outputs of the multipliers 10d and 10e respectively, and an adder 10h.

The action of the conventional apparatus is explained referring to FIG. 16.

FIG. 16 is a diagram showing the positional relation along the horizontal direction between the location of pixels in one field of the original image and the location of pixels of its size changed image at the size change rate of ⅔. When the size change rate is ⅔, its inverse or 1.5 is accumulated in the horizontal interpolation factor generator circuit 101. As shown in FIG. 16, the size is changed from the reference pixel DS0 or the 0th pixel of one field of the original image. The pixel DD0 in the size changed image corresponding to DS1 is spaced by 1.5 pixels from DS0. It is apparent from this figure that the horizontal interpolation factor p for the pixel DD0 of the size changed image is 0.5. As the interpolation factor for each pixel of the size changed image relative to the pixel of one field of the original image is calculated and used for interpolation of the pixel data, the size changed image will exhibit less foldover effects.

Another conventional image size changing apparatus is also known using as the interpolation factors a sum of the fraction of accumulation of an inverse of the size change rate and the offset for the size change rate (Japanese Patent Application Laid-open 11-25265). FIG. 17 is a block diagram showing an arrangement of the conventional apparatus.

The conventional apparatus shown in. FIG. 17 comprises a magnification setting 203 for setting a desired level of the size change rate, an interpolation factor generator 201 for calculating the interpolation factors from the size change rate, an offset circuit 202 for calculating the interpolation factors for calculating the interpolation factors from the size change rate, an interpolator 200 for interpolating an input image signal SI with the interpolation factors received from the interpolation factor generator 201, a field memory 205 for storage of interpolated image data received from the interpolator 200, and a read/write controller 204 for controlling the reading and writing of the data on the field memory 205. The image data retrieved from the field memory 205 by the action of the read/write controller 204 is transferred to the outside as an output image signal SO.

The action of the conventional apparatus is now explained referring to FIG. 18.

FIG. 18 is a diagram showing the positional relationship along the horizontal direction between the location of pixels of one field of the original image and the location of pixels of its size changed image at the size change rate of ⅔. The calculation of interpolation factors in the conventional apparatus is substantially similar to that described previously with FIGS. 15 and 16. This apparatus is however differentiated by the fact that the fraction of the accumulation of an inverse of the size change rate is added with the offset corresponding to the size change rate. Assuming that the size change rate is a=d/s, the offset b is b=1/(2×d) As the interpolation factors used for interpolation are determined from the distance data averaged between pixels, the size changed image will exhibit less foldover effects.

However, such conventional apparatuses have the following drawbacks.

The first drawback resides in the conventional apparatus shown in FIG. 15 where the interpolation factors are calculated from a difference between the distance between pixels in one field of the original image and the distance between pixels in the sized changed image. Because a difference between the two distances is not always present, the interpolation between pixels may sometimes be disabled. Accordingly, the data ratio between pixels in the size changed image will hardly be uniform thus causing an undesired artifact in the image.

While the conventional apparatus shown in FIG. 17 can successfully avoid the data ratio between pixels in the size changed image from being varied to cause degradation of the image quality, the second drawback resides in both the conventional apparatuses shown in FIGS. 15 and 17 where the interpolation factors are calculated from distance data between the location of a pixel in one field of the original image and the location of its corresponding pixel in the size changed image, hence failing match a vertical ratio between a visual area determined by pixel data of the original image and a visual area determined by pixel data of the size changed image. This result in an imperfect action of the interpolation, causing an undesired artifact in the size changed image.

SUMMARY OF THE INVENTION

It is an object of the present invention to provide a method and an apparatus for changing the size of image while eliminating the above-described drawbacks.

Other objects of the present invention will become clear as the description proceeds.

An image size changing method of the present invention for changing the size of an original image according to a size change rate and releasing a resultant size changed image is provided comprising the steps of: generating interpolation factors from the size change rate; and interpolating the original image with the interpolation factors to develop the size changed image, wherein the interpolation factor generating step is arranged for calculating the interpolation factors having a ratio between a visual area determined by pixel data of the original image and a visual area determined by pixel data of its size changed image.

An image size changing apparatus of the present invention for changing the size of an original image according to a size change rate and releasing a resultant size changed image is provided comprising: an interpolation factor generating means for generating interpolation factors from the size change rate; and an interpolating means for interpolating the original image with the interpolation factors to develop the size changed image, wherein the interpolation factor generating means is arranged for calculating the interpolation factors having a ratio between a visual area determined by pixel data of the original image and a visual area determined by pixel data of its size changed image.

BRIEF DESCRIPTION OF THE DRAWINGS

FIG. 9 is a diagram explaining the action of the horizontal interpolation factor generator at the size change rate of ⅘ in the apparatus of FIG. 1;

FIG. 10 is a diagram explaining the action of the horizontal interpolation factor generator at the size change rate of ⅝ in the apparatus of FIG. 1;

DETAILED DESCRIPTION OF THE PREFERRED EMBODIMENTS

One embodiment of the present invention will be explained referring to the accompanying drawings.

Figure 1:
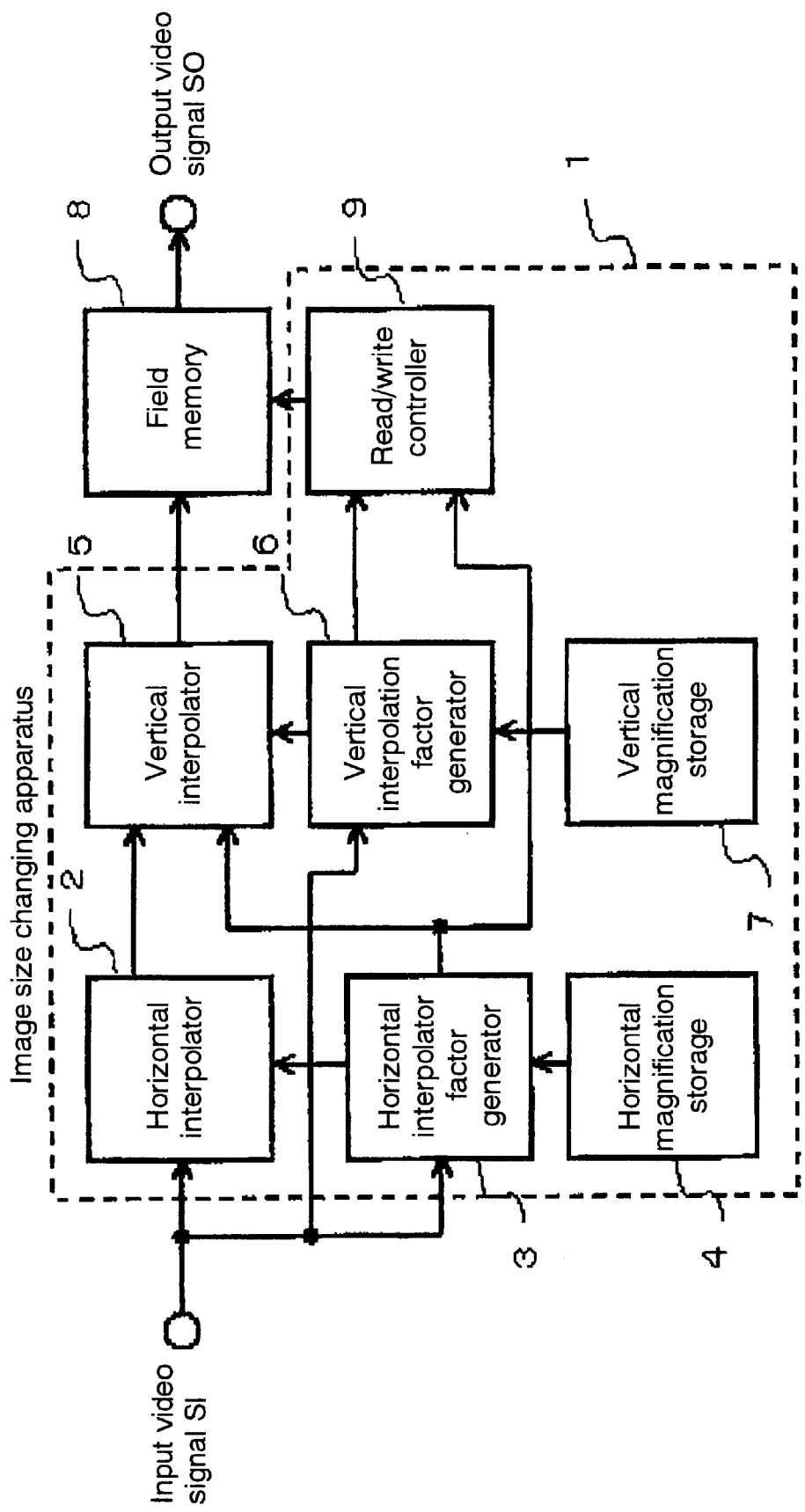
FIG. 1 is a block diagram of an image size changing apparatus showing one embodiment of the present invention.

FIG. 1 is a block diagram of an image size changing apparatus according to the embodiment of the present invention.

First, referring to FIG. 1, the features of the present invention will be explained.

The image size changing apparatus according to the present invention is provided for changing the size of an image, e.g., by enlargement or reduction or more particularly for interpolating its image data at a ratio between a visual area determined by pixel data of the original image and a visual area determined by pixel data of a size changed image with the use of a relatively smaller circuit arrangement to yield the size changed image which has minimum artifacts such as foldover distortion.

As shown in FIG. 1, a horizontal interpolation factor generator 3 produces from the size change rate supplied by a horizontal magnification storage 4 three horizontal interpolation factors hw1, hw2, and hw3, each having a ratio between a visual area determined by image data of an original image and a visual area determined by image data of its size changed image, which are used for interpolation in a horizontal interpolator 2. The horizontal interpolation factors hw1, hw2, and hw3 are generated at timings of a clock signal of which the frequency is two times greater that that of a pixel clock signal. The horizontal interpolation factors are calculated using the measurements of pixel data per field of the original image and the accumulation of inversions of the size change rate. Using the horizontal interpolation factors calculated by the horizontal interpolation generator 3, the horizontal interpolator 2 produce pixel data through interpolation between neighbor pixels adjacent to the target pixel. The interpolation in the vertical direction can also be carried out by a group of a vertical interpolator 5, a vertical interpolation factor generator 6, and a vertical magnification setting 7 using the same manner except at timings of the horizontal sync signal.

Accordingly, produced is the pixel data of which the size is increased ha times ($0 < ha \leq 2$) in the horizontal direction and va times ($0 < va \leq 1$) in the vertical direction greater than the size of one field of the original image with containing a minimum of artifact such as foldover distortion. The magnification in the horizontal direction may be up to two times greater since the timing of movement is determined by two times the frequency of the pixel clock signal.

The image size changing apparatus of the embodiment of the present invention shown in FIG. 1 is now explained in more detail.

As shown in FIG. 1, the image size changing apparatus 1 includes a combination of the horizontal interpolator 2 and the vertical interpolator 2 for interpolating an input image signal SI in both the horizontal and vertical directions using the horizontal and vertical interpolation factors received from the horizontal interpolation factor generator 3 and the vertical interpolation factor generator 6 respectively. Using the horizontal size change rate received from the horizontal magnification storage 4 and the sync signal timed with the input image signal SI, the horizontal interpolator factor generator 3 produces three horizontal interpolation factors hw1, hw2, and hw3, each having a ratio between a horizontal component of the visual area determined by image data of an original image and a horizontal component of the visual area determined by image data of its size changed image. The horizontal interpolation factors hw1, hw2, and hw3 are timed with a clock signal of which the frequency is two times greater than the pixel clock signal of the input image signal SI. Also produced by the horizontal interpolation factor generator 3 is a horizontal pixel enable signal indicative of effective ones of the pixel data from the horizontal interpolator 2 to be received by the vertical interpolator 5 and a write-in controller 9. Using the vertical size change rate received from the vertical magnification storage 7 and the sync signal timed with the input image signal SI, the vertical interpolator factor generator 6 produces three vertical interpolation factors vw1, vw2, and vw3, each having a ratio between a vertical component of the visual area determined by image data of an original image and a vertical component of the visual area determined by image data of its size changed image. The vertical interpolation factors vw1, vw2, and vw3 are timed with the horizontal sync signal of the input image signal SI. Also produced by the vertical interpolation factor generator 6 is a vertical pixel enable signal indicative of effective ones of the pixel data from the vertical interpolator 5 to be received by the write-in controller 9. The write-in controller 9 are responsive to the horizontal pixel enable signal from the horizontal interpolation factor generator 3, the vertical pixel enable signal from the vertical interpolation factor generator 6, and the sync signal of the input image signal SI for controlling the writing of the pixel data received from the vertical interpolator 5 into the field memory 8.

More details of the horizontal interpolator 2 and the vertical interpolator 5 are now explained. Each interpolator may comprise a group of latch circuits for delaying the input image signal by one pixel period or line memories for delaying the input image signal by one horizontal period, multipliers, and an adder.

Figure 2:
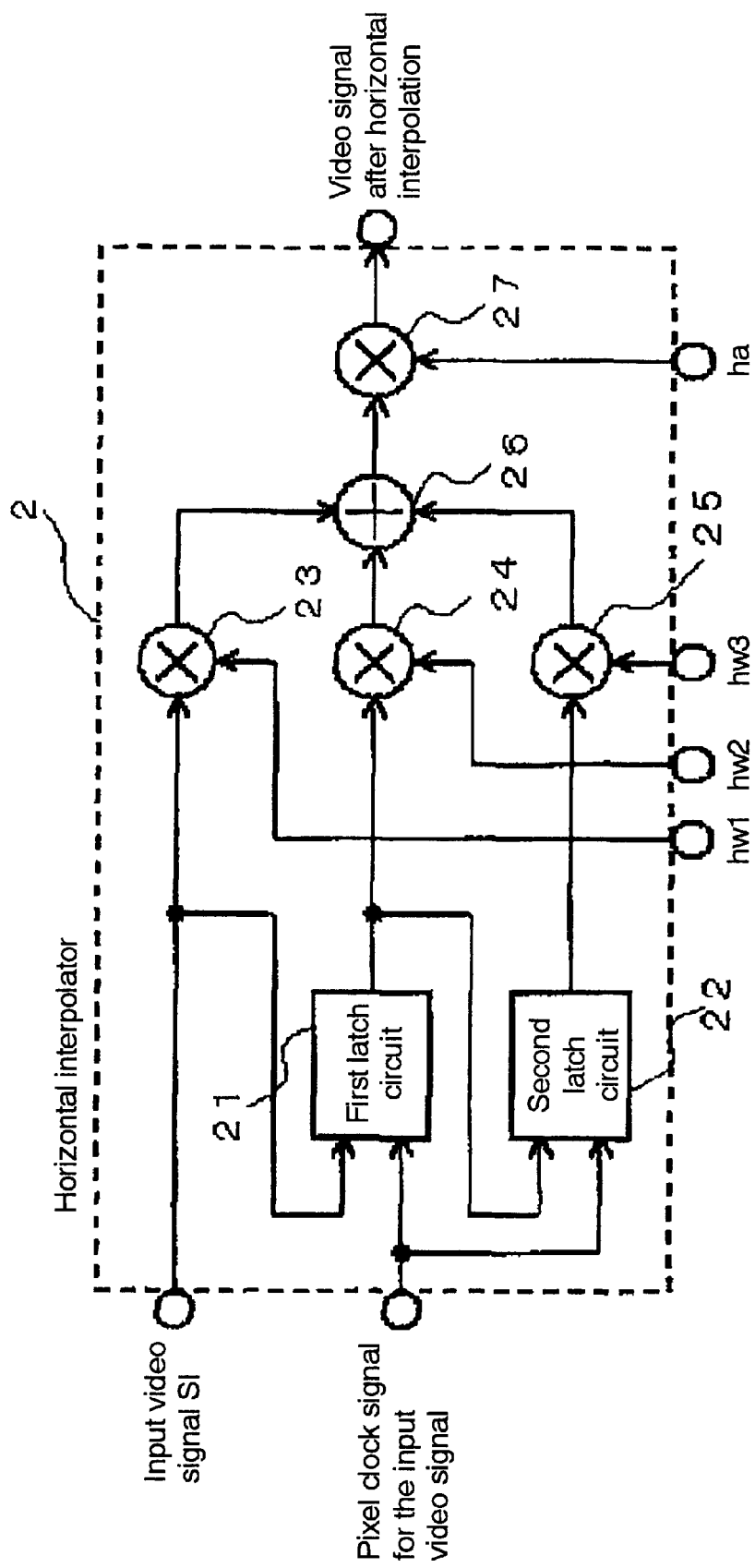
FIG. 2 is a block diagram of a horizontal interpolator in the apparatus of FIG. 1.
Figure 3:
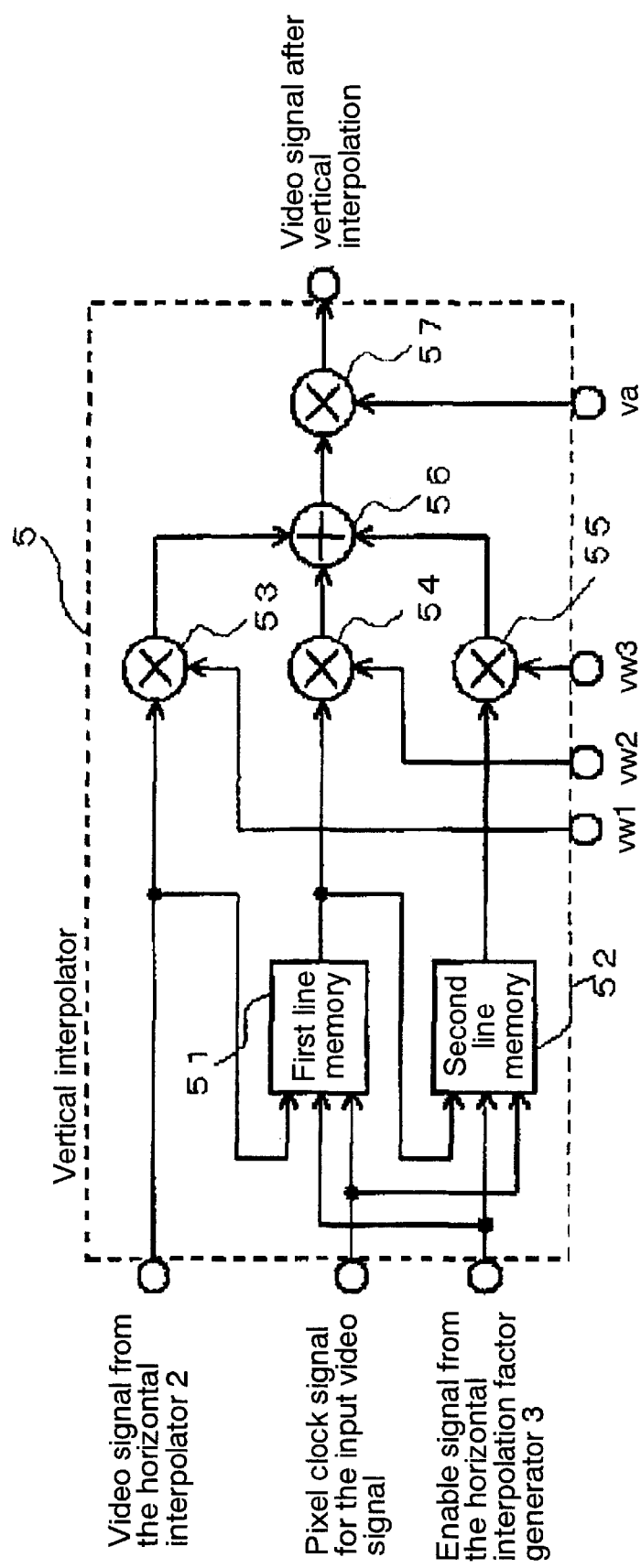
FIG. 3 is a block diagram of a vertical interpolator in the apparatus of FIG. 1.

FIGS. 2 and 3 illustrate the horizontal interpolator 2 and the vertical interpolator 5 respectively shown in FIG. 1. While the horizontal interpolator 2 and the vertical interpolator 5 are substantially identical in the arrangement to each other, the horizontal interpolator 2 will be explained by way of example.

As shown in FIG. 2, the horizontal interpolator 2 comprises a couple of first and second latch circuits 21, 22 for delaying the input image signal by one pixel period, first, second, and third multipliers 23, 24, 25 for multiplying the input image signal SI, an output image signal from the first latch circuit 21, and another output image signal from the second latch circuit 22 by their corresponding horizontal interpolation factors hw1, hw2, and hw3 respectively, an adder 26 for summing the products of the first, second, and third multipliers 23, 24, 25, and a multiplier 27 for multiplying the sum of the adder 26 by the size change rate ha. While the first latch circuit 21 is connected at one input directly to the input image signal SI, the second latch circuit 22 is connected at one input to the output of the first latch circuit 21. Their inputs are latched with the pixel clock signal. Accordingly, three consecutive pixel data aligned horizontally in a time sequence are obtained which are a data in the input image signal SI, an output of the first latch circuit 21, and an output of the second latch circuit 22. The first, second, and third, multipliers 23, 24, 25 connected to the input image signal SI, the output of the first latch circuit 21, and the output of the second latch circuit 22 respectively multiply their inputs by the three horizontal interpolation factors hw1, hw2, and hw3 respectively. Their resultant products are transferred to the adder 26 where they summed up. The sum released from the adder 26 is then multiplied by the size change rate ha in the multiplier 27. Throughout those actions of the horizontal interpolator 2, three consecutive pixel data aligned horizontally in a time sequence of the input image signal SI are interpolated using the horizontal interpolation factors hw1, hw2, and hw3. For implementing the vertical interpolator 5, the first latch circuit 21 and the second latch circuit 22 are replaced by a first line memory 51 and a second line memory 52 respectively to have a circuitry arrangement shown in FIG. 3. For dedicating to reduction of the image size, the first and second line memories 51, 52 may be decreased in the memory area by using the horizontal pixel enable signal from the horizontal interpolation factor generator 3 during the controlling of writing and reading of data on the first and second line memories 51, 52. The memory area of the first and second line memories 51, 52 is determined by a combination of the setting rate in the horizontal magnification storage 4 and the number of effective pixels in one field of the original image to be changed in the size.

The arrangement of the horizontal interpolation factor generator 3 is now explained in more detail. The horizontal interpolation factor generator 3 may be implemented by dividers, a counter, an accumulator, comparators, and calculators.

Figure 4:
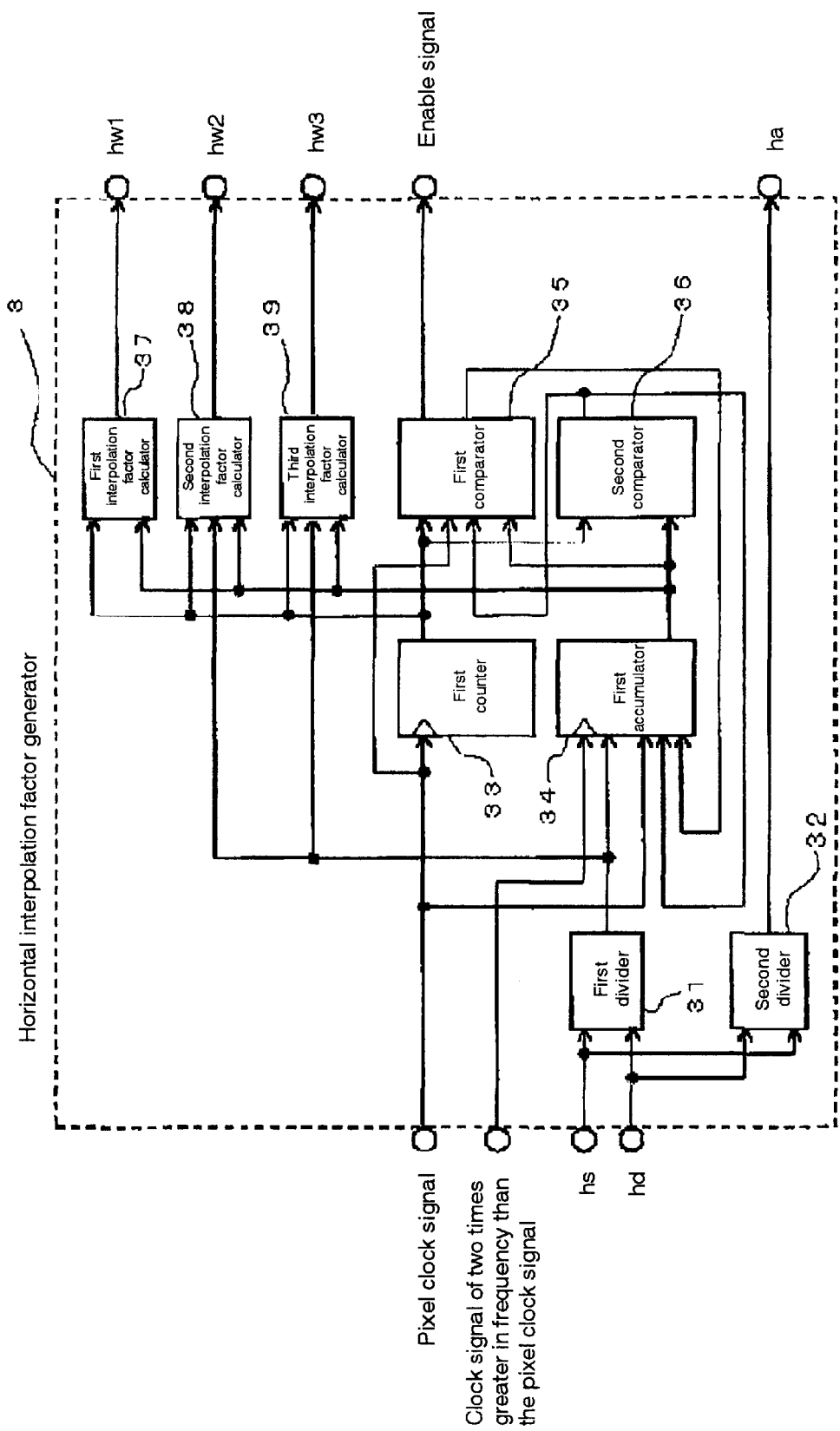
FIG. 4 is a block diagram of a horizontal interpolation factor generator in the apparatus of FIG. 1.

FIG. 4 is a block diagram showing an arrangement of the horizontal interpolation factor generator 3 in the apparatus shown in FIG. 1. As shown in FIG. 4, the horizontal interpolation factor generator 3 comprises a first divider 31 for calculating an inverse of the desired horizontal size change rate from a horizontal rate hs of one field of the original image and a horizontal rate hd of the size changed image stored in the horizontal magnification storage 4 and releasing it as hwp; a second divider 32 for calculating the desired size change rate from the two rates hs and hd and releasing its as ha, a first counter 33 for calculating a clock count hrc from the pixel clock signal, a first accumulator 34 responsive to the pixel clock signal, a comparison signal output of a first comparator 35, and a comparison signal output of a second comparator 36 for accumulating the outputs hwp of the first divider 31 at timing of two times greater than the frequency of the pixel clock signal and releasing them as hwc, the first comparator 35 for releasing a comparison signal indicating that the clock count hrc from the first counter 33 exceeds the accumulation hwc from the first accumulator 34, the second comparator 36 for releasing a comparison signal indicating that a difference between the clock count hrd from the first counter 33 and the accumulation hwc from the first accumulator 34 exceeds the output hwp of the first divider 31, and first, second, and third, interpolation factor calculators 37, 38, 39 for calculating the horizontal interpolation factors hw1, hw2, and hw3 respectively from the clock count hrc of the first counter 33, the accumulation hwc of the first accumulator 34, and the output hwp of the first divider 31. The first comparator 35 is also responsive to the pixel clock signal and the comparison signal from the second comparator 36 for producing the horizontal pixel enable signal indicating whether the pixel data of an image signal released from the horizontal interpolator 2 is valid or not. The first interpolation factor calculator 37 produces and releases hw1=(1−hrc+hwc) as the first horizontal interpolation factor. The second interpolation factor calculator 38 produces and releases hw2=(hwp−hw1) as the second horizontal interpolation factor when hwp≦(hw1+1) and hw2=1 when not so. The third interpolation factor calculator 39 produces and releases hw2=0 as the third horizontal interpolation factor when hwp≦(hw1+1) and hw2=(hwp−hw1−1) when not so.

Details of the vertical interpolation factor generator 6 are now explained. The vertical interpolation factor generator 6 may be implemented by for example, dividers, a counter, an accumulator, a comparator, and calculators.

Figure 5:
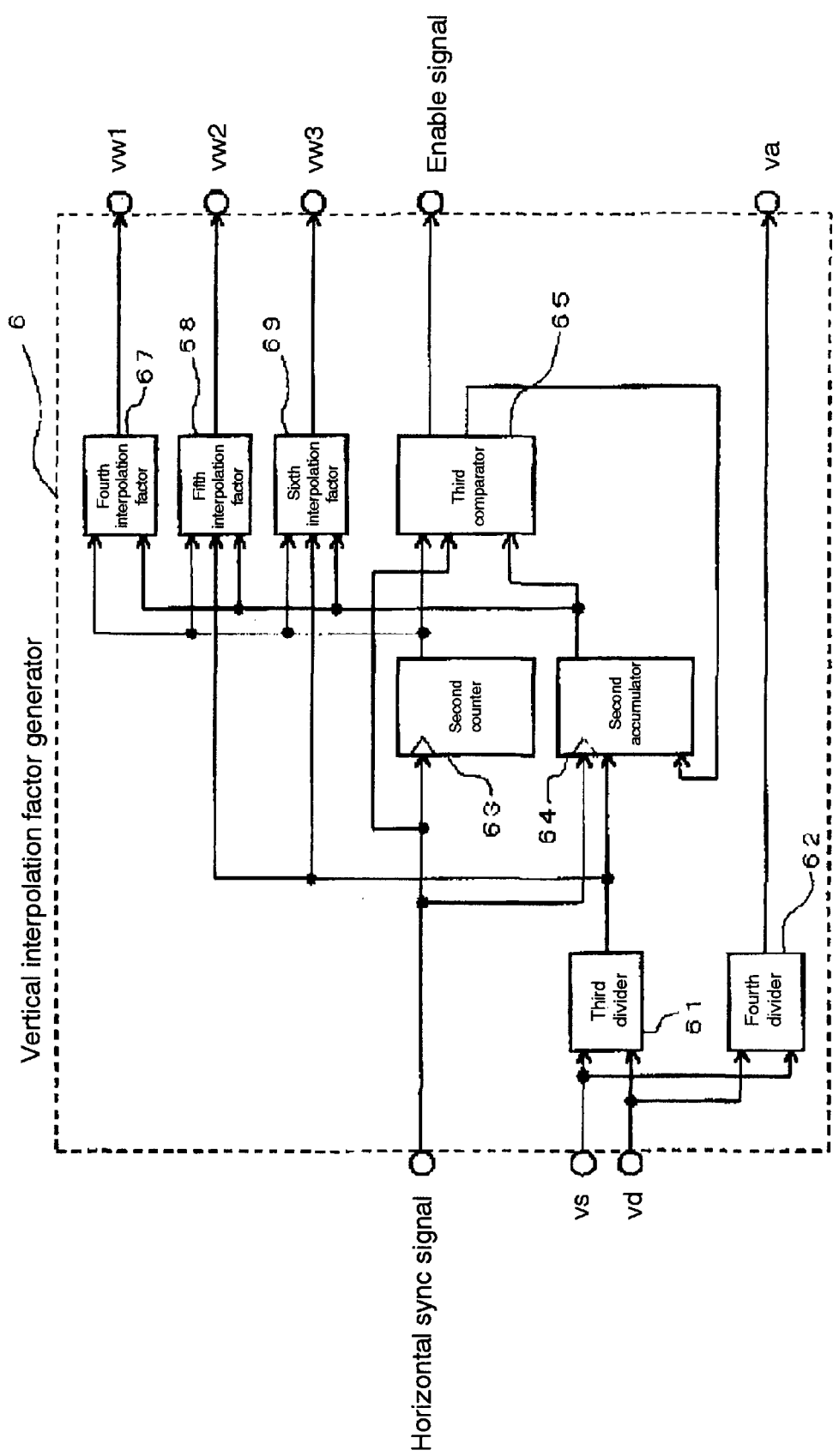
FIG. 5 is a block diagram of a vertical interpolation factor generator in the apparatus of FIG. 1.

FIG. 5 is a block diagram showing an arrangement of the vertical interpolation factor generator 6 in the apparatus shown in FIG. 1. As shown in FIG. 5, the vertical interpolation factor generator 6 comprises a third divider 61 for calculating an inverse of the desired vertical size change rate from a vertical rate vd of one field of the original image and a vertical rate vd of the size changed image stored in the vertical magnification storage 7 and releasing it as vwp, a fourth divider 62 for calculating the desired size change rate from the two rates vs and vd and releasing its as va, a second counter 63 for calculating a clock count vrc from the horizontal sync signal, a second accumulator 64 responsive to the horizontal sync signal, a comparison signal output of a third comparator 65 for accumulating the outputs vwp of the third divider 61 at timing of the horizontal sync signal and releasing them as vwc, the third comparator 65 for releasing a comparison signal indicating that the count vrc from the second counter 63 exceeds the accumulation vwc from the second accumulator 64, and fourth, fifth, and sixth, interpolation factor calculators 67, 68, 69 for calculating the vertical interpolation factors vw1, vw2, and vw3 respectively from the count vrc of the second counter 63, the accumulation vwc of the second accumulator 64, and the output vwp of the third divider 61. The third comparator 65 is also responsive to the horizontal sync signal for producing the vertical pixel enable signal indicating whether the pixel data of an image signal released from the vertical interpolator 5 is valid or not. The fourth interpolation factor calculator 67 produces and releases vw1=(1−vrc+vwc) as the fourth vertical interpolation factor. The fifth interpolation factor calculator 68 produces and releases vw2=(vwp−vw1) as the fifth vertical interpolation factor when vwp≦(vw1+1) and vw2=1 when not so. The sixth interpolation factor calculator 69 produces and releases vw2=0 as the sixth vertical interpolation factor when vwp≦(vw1+1) and vw2=(vwp−vw1−1) when not so. The vertical interpolation factor generator 6 is substantially equal in the arrangement to the horizontal interpolation factor generator 3 shown in FIG. 4, except that the second comparator 36 of the horizontal interpolation factor generator 3 is eliminated and the actions of the counter and the accumulator are timed with the horizontal sync signal.

The operation of the apparatus shown in FIG. 1 will be explained.

It is common for changing the size of an image of an image signal to decrease or increase the pixel data of the input image signal SI. It is assumed in this embodiment that the size change rates for changing the size of data of the input image signal SI are ⅔, ⅓, and ⅝. As the size changing process in the horizontal direction is identical to that in the vertical direction except that the size can be reduced only in the vertical direction, it will be described in more detail by way of example.

Figure 6:
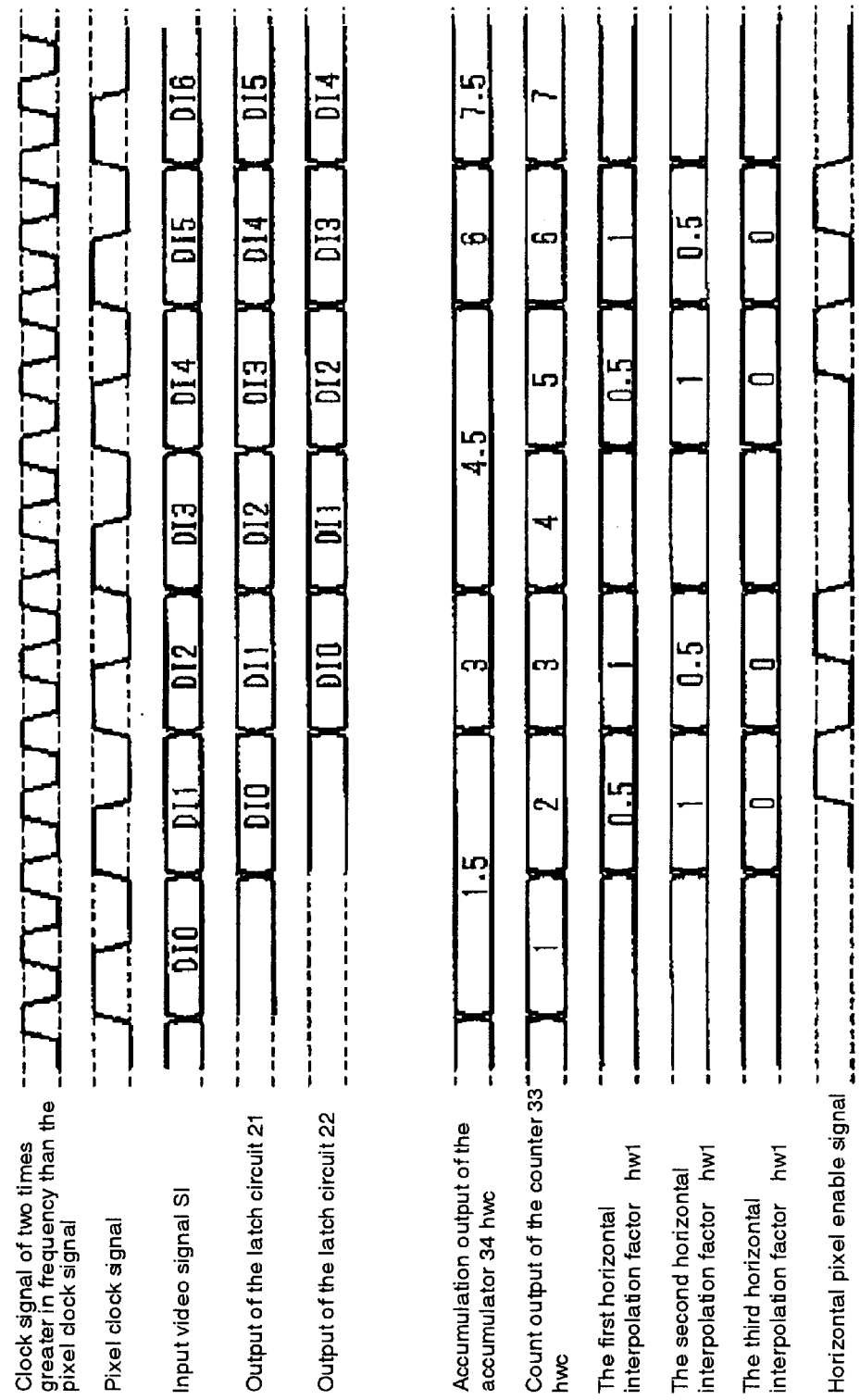
FIG. 6 is a timing chart showing the action of the horizontal interpolation factor generator at the size change rate of ⅔ in the apparatus of FIG. 1.

FIG. 6 is a timing chart showing the action of the horizontal interpolation factor generator 3 in the apparatus shown in FIG. 1 with the size change rate of ⅔.

As shown in FIG. 6, the count hrc of the pixel clock signal determined by the first counter 33 is 1 at T01 thus to allow the first accumulator 34 to calculate the accumulation hwc as 1.5 from 1.5 of the output hwp at the size change rate of ⅔ of the first divider 31. At T02, as hrc becomes smaller than hwc, the first counter 33 counts up to 2. The first accumulator 34 remains intact, its output hwc is 1.5. Between T03 and T04, as hrc of 2 is greater than hwc of 1.5, the horizontal pixel enable signal shifts to its enable state. At T04 where hrc is greater than hwc, the first counter 33 counts up to 3 thus allowing the first accumulator 34 to carry out accumulation of hwp to have an output of 3. Between T05 and T06, hrc is not smaller than (equal to at the moment) hwc thus causing the horizontal pixel enable signal to shift to its enable state. The first, second, and third horizontal interpolation factors hw1, hw2, and hw3 are determined by their corresponding, first, second, and third interpolation factor calculators 37, 38, 39 calculating from the output hrc of the first counter 33 and the output hwc of the first accumulator 34. As a result, the horizontal pixel enable signal is enabled at two pixels out of three pixels in each field of the original image signal SI when the size change rate is ⅔. The horizontal pixel enable signal of this pattern then drives the write-in controller 9 to store in the field memory 8 its corresponding pattern of pixel data which develops an image decreased in the size from the original image.

Figure 7:
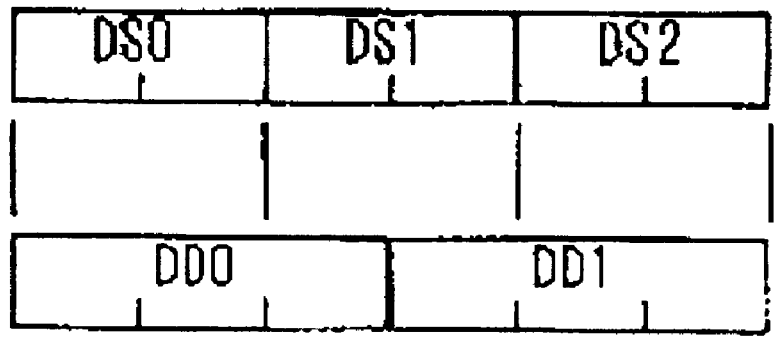
FIG. 7 is a diagram explaining the action of the horizontal interpolation factor generator at the size change rate of ⅔ in the apparatus of FIG. 1.

Referring to FIG. 7, the image signal stored in the field memory 8 is interpolated by the horizontal interpolator 2 using the horizontal interpolation factors hw1, hw2, and hw3 determined by the first interpolation factor calculator 37, the second interpolation factor calculator 38, and the third interpolation factor calculator 39 respectively. More particularly, assuming that the pixel data of the original image is DSn and the pixel data of an size changed image is DDn, DD0 and DD1 are calculated by interpolation with the interpolation factors shown in the same drawing for the size change rate of ⅔. Accordingly, the interpolation can be made with a ratio between a visual area determined by the pixel data of the original image and a visual area determined by the pixel data of the size changed image.

Figure 8:
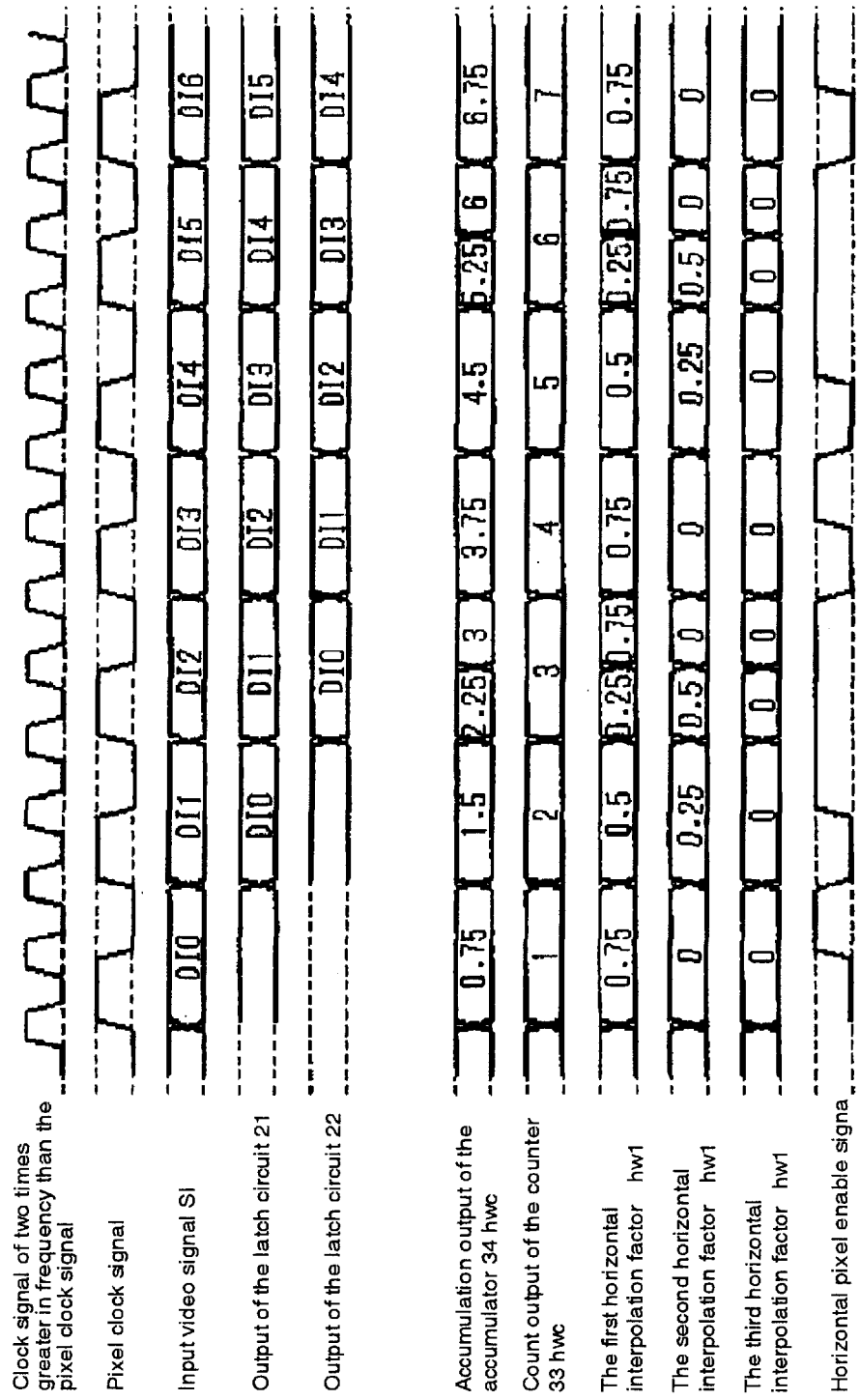
FIG. 8 is a timing chart showing the action of the horizontal interpolation factor generator at the size change rate of ⅘ in the apparatus of FIG. 1.

FIG. 8 is a timing chart showing the action of the horizontal interpolation factor generator 3 in the apparatus shown in FIG. 1 with the size change rate of ⅘.

As shown in FIG. 8, the count hrc of the pixel clock signal determined by the first counter 33 is 1 at T11 thus to allow the first accumulator 34 to calculate the accumulation hwc as 0.75 from 0.75 of the output hwp at the size change rate of ⅘ of the first divider 31. Between T12 and T13, as hrc is not smaller than hwc, the horizontal pixel enable signal shifts to its enable state. Also, from T13 to T15, the same action is made. At T15, hrc is still greater than hwc, the count output hrc of the first counter 33 is increased to 3 allowing the first accumulator 34 to carry out accumulation of hwp to have an output of 2.25. Between T15 and T16, a difference between hrc and hwc is not smaller than (equal to at the moment) hwp of the output of the first divider 31 thus causing the second comparator 36 to shift the horizontal pixel enable signal to its enable state between T15 and T16. At T16, the accumulator 34 is controlled to accumulate the output hwp of the first divider 31. Between T16 and T17, hrc is not smaller than hwc hence causing the horizontal pixel enable signal to shift to its enable state. From those actions at the size change rate of 4/3, the horizontal pixel enable signal is enabled at four pixels for three pixels of one field of the original image. The horizontal pixel enable signal of this pattern then drives the write-in controller 9 to store in the field memory 8 its corresponding pattern of pixel data which develops an image changed in the size from the original image.

Referring to FIG. 9, the image signal stored in the field memory 8 is interpolated by the horizontal interpolator 2 using the horizontal interpolation factors hw1, hw2, and hw3 determined by the first interpolation factor calculator 37, the second interpolation factor calculator 38, and the third interpolation factor calculator 39 respectively. More particularly, assuming that the pixel data of the original image is DSn and the pixel data of an size changed image is DDn, DD0, DD1, DD2, and DD3 are calculated by interpolation with the interpolation factors shown in the same drawing for the size change rate of 4/3. Accordingly, the interpolation can be made with a ratio between a visual area determined by the pixel data of the original image and a visual area determined by the pixel data of the size changed image.

FIG. 10 illustrates interpolation for the size change rate of 5/8 according to the present invention, where DD1 is calculated by interpolation of the pixel data of DS1, DS2, and DS3 in one field of the original image at a ratio between a visual area determined by the pixel data of the original image and a visual area determined by the pixel data of the size changed image.

The interpolation of vertical pixel data can be made by the same manner with the vertical interpolation factor generator 6 and the vertical interpolator 5 handling a horizontal line of data as a unit to be processed.

As a result, an image signal of the pixel data changed in the size, both in the horizontal and vertical directions, at the desired size change rate from the input image signal SI can be stored in the field memory 8.

The effects of the action of the image size changing apparatus of the embodiment of the present invention are now explained.

A first effect is to eliminate a low-pass filter for suppressing a high frequency component of the pixel data in one field of the original image in the size changing process, hence decreasing the overall arrangement of the apparatus.

The reason for suppressing a high frequency component of the input image signal is the installation of the interpolating means for interpolating the input image signal using the interpolation factors determined from the correlation between the pixel data of one field of the original image and the pixel data of a size changed image.

A second effect is to hardly cause uniformity of the data ratio between pixels or shortage of the data ratio when the size has been changed, hence permitting the size changing process to produce an image signal which is minimum declined in the quality.

The reason for the second effect is the interpolation for changing the size carried out using the interpolation factors determined at a ratio between a visual area determined by the pixel data of the original image and a visual data determined by the pixel data of a size changed image.

Another embodiment of the present invention will be described.

Figure 11:
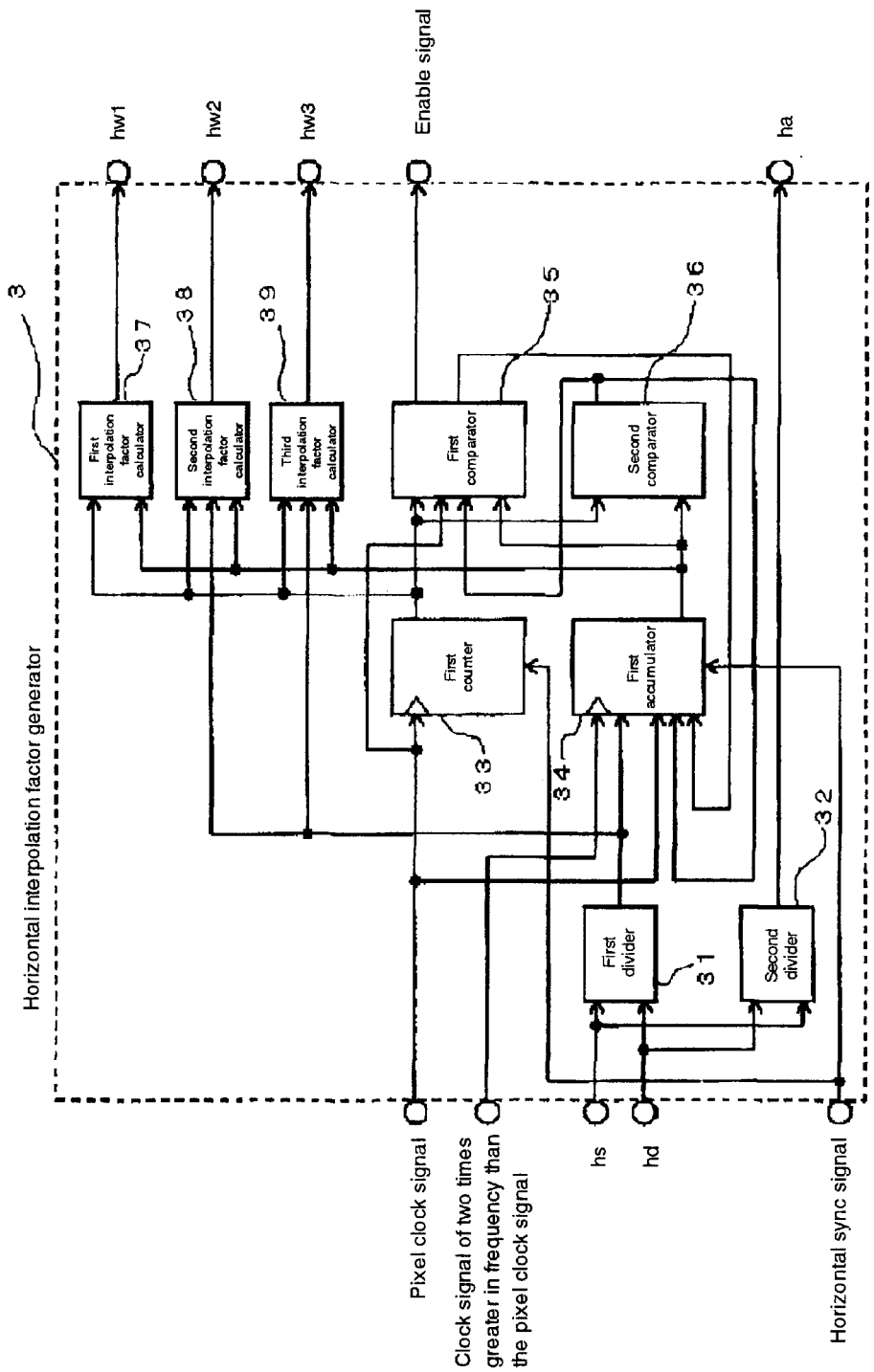
FIG. 11 is a block diagram showing a modification of the horizontal interpolation factor generator in the apparatus of FIG. 1.
Figure 12:
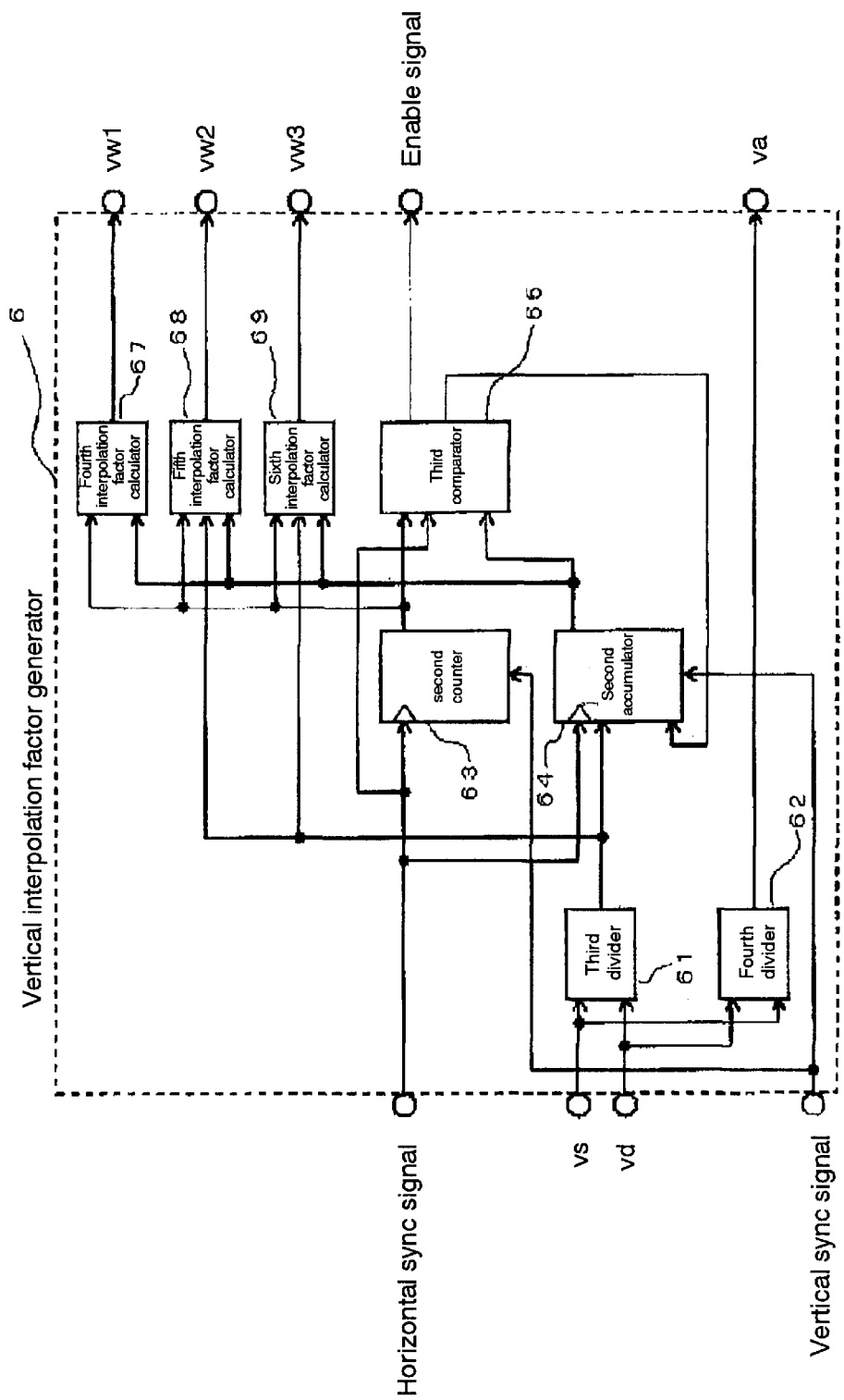
FIG. 12 is a block diagram showing a modification of the vertical interpolation factor generator in the apparatus of FIG. 1.

The another embodiment is provided in which the horizontal interpolation factor generator 3 and the vertical interpolation factor generator 6 shown in FIG. 1 are replaced by another horizontal interpolation factor generator 3 and another vertical interpolation factor generator 6 respectively shown in FIGS. 11 and 12.

As shown in FIGS. 11 and 12, the another horizontal interpolation factor generator 3 receives the horizontal sync signal as a reset signal at its first counter 33 and first accumulator 34 and the another vertical interpolation factor generator 6 receives the vertical sync signal as a reset signal at its second counter 63 and second accumulator 64. Since the interpolation factors for horizontal data in the image signal are identical in each horizontal sync period, the action of the first counter 33 and the first accumulator 34 in the horizontal interpolation factor generator 3 can be reset in every horizontal sync period by the horizontal sync signal used as the reset signal thus allowing the first counter 33 or the first accumulator 34 to be replaced by a simpler type having a less performance of counting. Also, since the interpolation factors for vertical data in the image signal are identical between images, the action of the second counter 63 and the second accumulator 64 in the vertical interpolation factor generator 6 can be reset by the vertical sync signal used as the reset signal, thus allowing the second counter 63 or the second accumulator 64 to be replaced by a simpler type having a less performance of counting.

In this embodiment, the counters and accumulators in both the horizontal interpolation factor generator 3 and the vertical interpolation factor generator 6 are used of simpler, lower performance types, thus favorably decreasing the number of bits to be handled.

Figure 13:
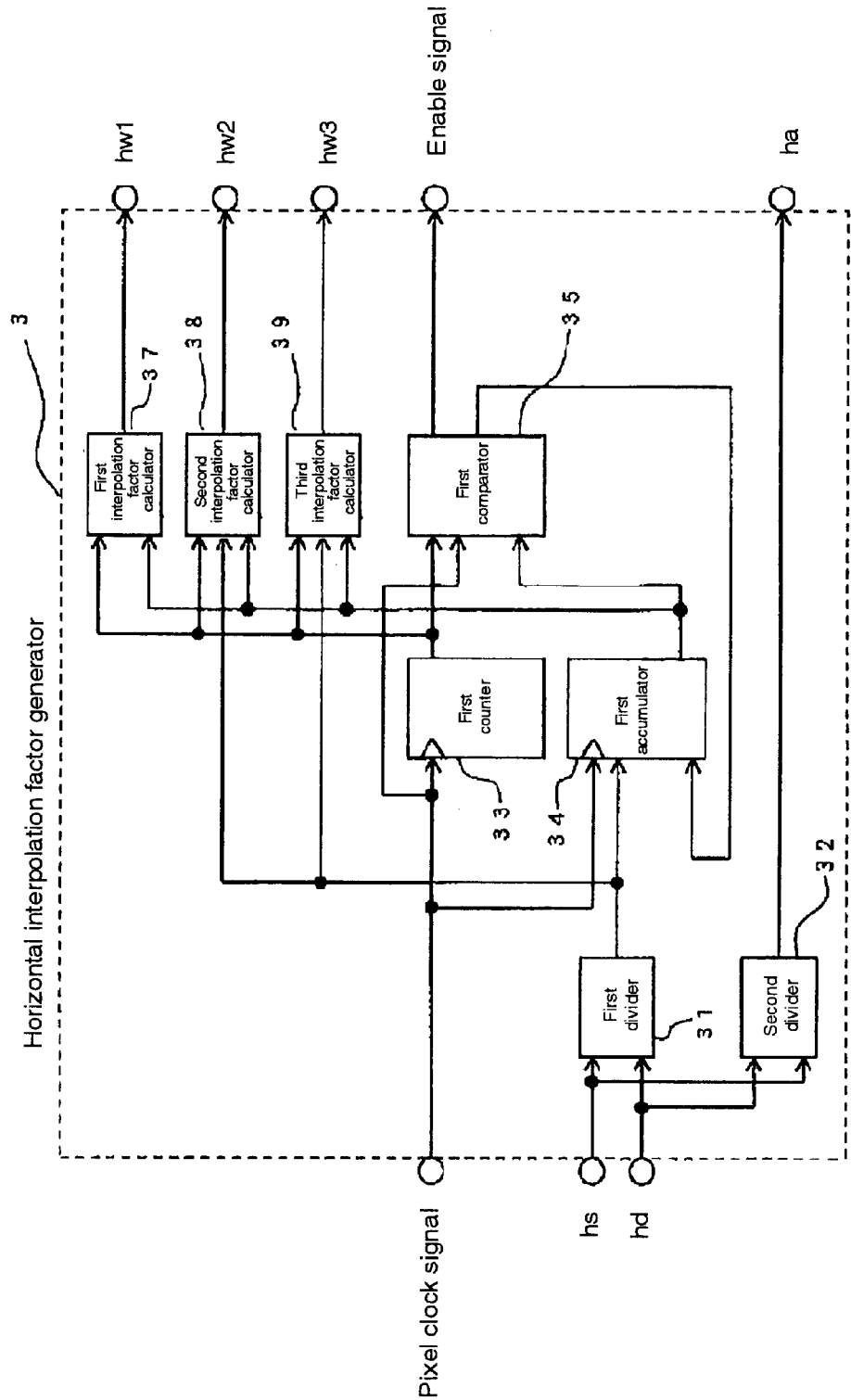
FIG. 13 is a block diagram showing another modification of the horizontal interpolation factor generator in the apparatus of FIG. 1.

FIG. 13 illustrates another modification of the horizontal interpolation factor generator 3 shown in FIG. 1. The modified horizontal interpolation factor generator 3 shown in FIG. 13 is applicable when no size changing in the horizontal direction is required. More particularly, the horizontal interpolation factor generator 3 shown in FIG. 4 is used as modified to be identical to the vertical interpolation factor generator 6 shown in FIG. 5. In the modified horizontal interpolation factor generator 3 shown in FIG. 13, the counting actions of its first counter 33 and first accumulator 34 are timed with the pixel clock signal.

In FIG. 13, this allows the circuitry arrangement of the horizontal interpolation factor generator 3 to be simplified.

Figure 14:
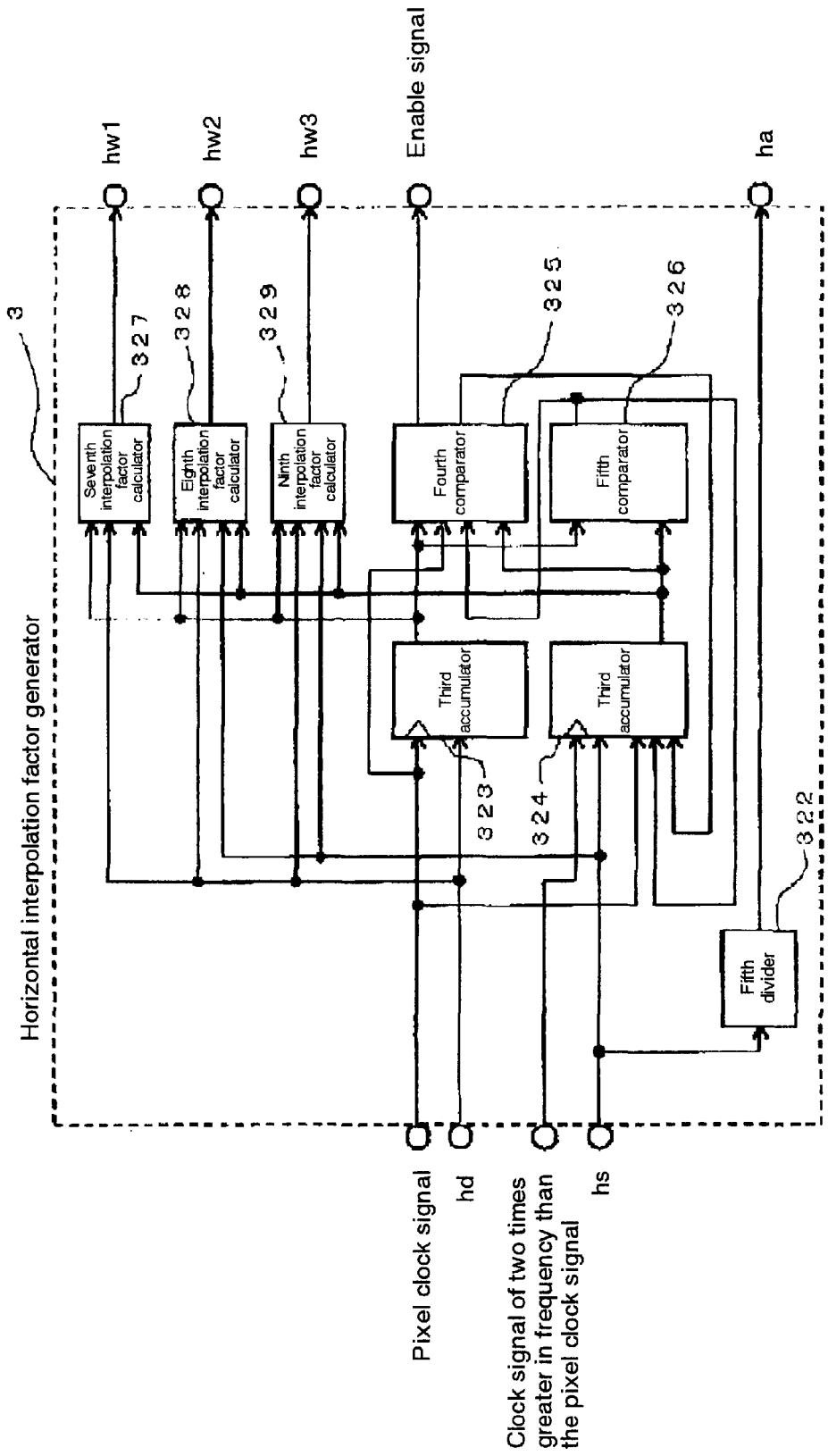
FIG. 14 is a block diagram showing a further modification of the horizontal interpolation factor generator in the apparatus of FIG. 1.
Figure 15:
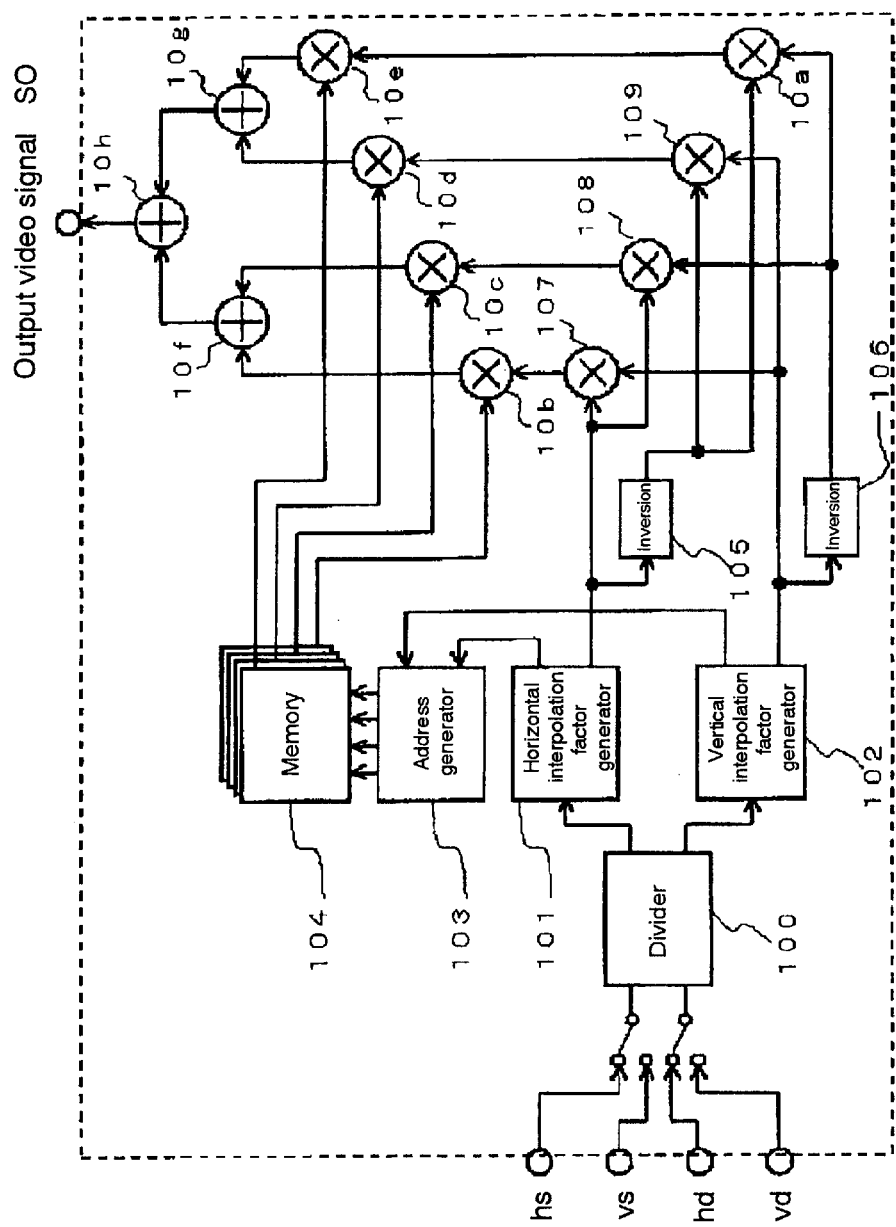
FIG. 15 is a block diagram showing an arrangement of a conventional apparatus.
Figure 16:
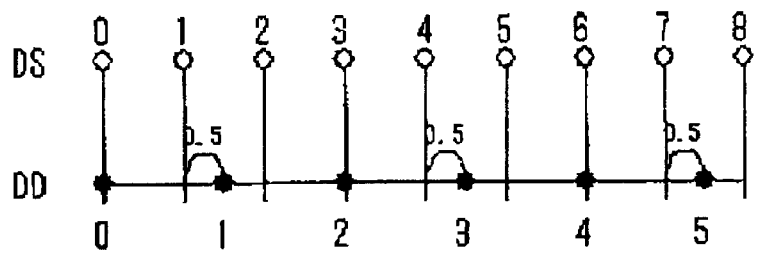
FIG. 16 is a diagram explaining the action of the conventional apparatus of FIG. 15.
Figure 17:
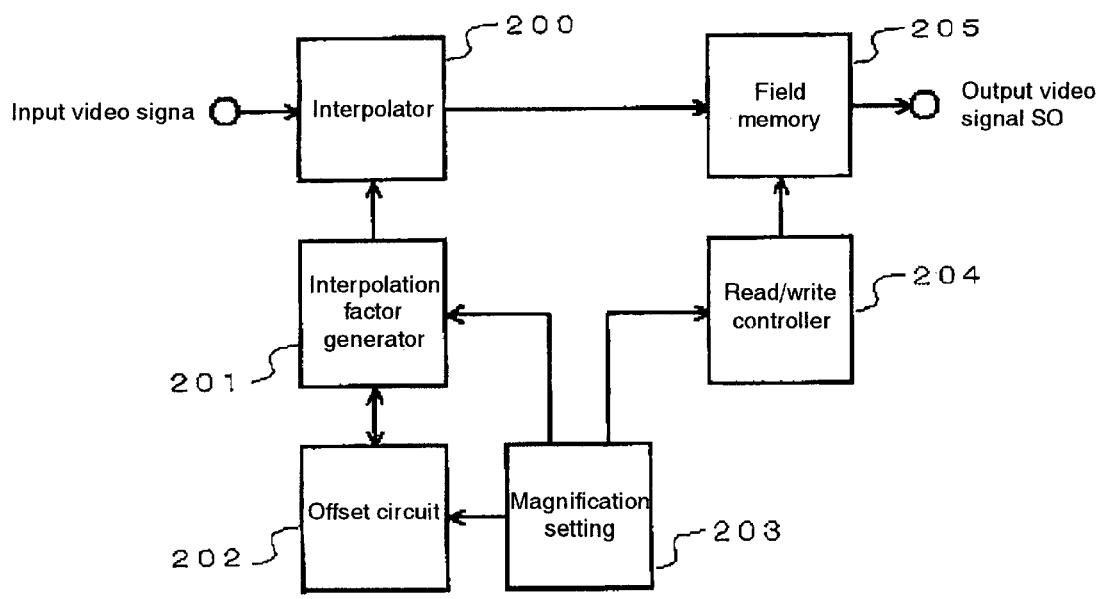
FIG. 17 is a block diagram showing an arrangement of another conventional apparatus.
Figure 18:
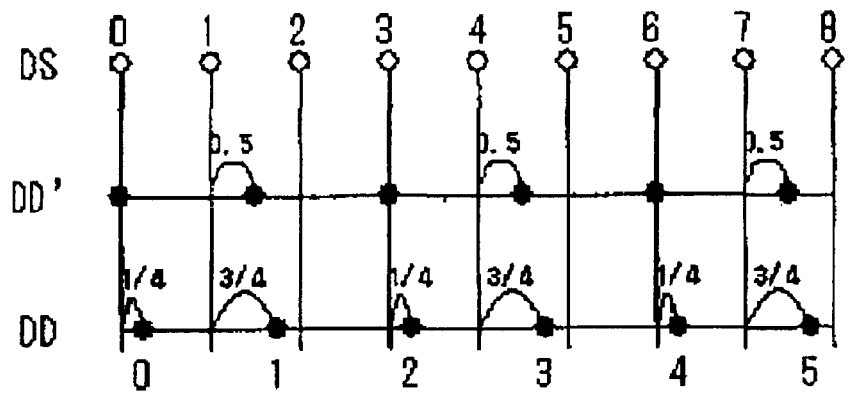
FIG. 18 is a diagram explaining the action of the another conventional apparatus of FIG. 17.

FIG. 14 illustrates a further modification of the horizontal interpolation factor generator 3 in the apparatus shown in FIG. 1.

The modified horizontal interpolation factor generator 3 shown in FIG. 14 is arranged in which the first counter 3 of the horizontal interpolation factor generator 3 shown in FIG. 4 is replaced by a third accumulator 323 while the first divider 31 is eliminated.

As shown in FIG. 14, the third accumulator 323 is provided for accumulation of the rate hd indicative of the size of a size change image as received from the horizontal magnification storage 4. A fourth accumulator 324 is provided for accumulation of the rate hs indicative of the size of one field of the original image as received from the horizontal magnification storage 4. A fifth divider 322 is provided for calculating an inverse of the rate of the size of one field of the original image and releasing it as ha. A seventh interpolation factor calculator 327 then calculates and releases hw1=(hd−hrc+hwc) as the first interpolation factor. An eighth interpolation factor calculator 328 calculates and releases hw2=(hs−hw1) as the second interpolation factor when hs≦(hw1+hd) and hw2=hd when not so. A ninth interpolation factor calculator 329 calculates and releases hw2=0 as the third interpolation factor when hs≦(hw1+hd)

and hw2=0 when not so. When the dividers for the same purpose are implemented by hardware, their circuitry arrangement has to be sized for increasing the operational accuracy. Also, the first accumulator 34 which performs accumulation of outputs of the first divider 31 has to calculate fractions after the decimal point and its hardware arrangement may be more intricate and increased in the overall size. In this modification, the third accumulator 323 and the fourth accumulator 324 are used in a combination for direct accumulation of the rate hs of the size of one field of the original image and the rate hd of the size of a sized changed image, hence eliminating the need of calculators for calculating the fractions and contributing to the simplification of the components of the horizontal interpolation factor generator 3. In addition, the multipliers in the horizontal interpolator 2 for interpolation with the horizontal interpolation factors may be simplified as their operation needs not to handle the fractions.

Similarly, the vertical interpolation factor generator 6 and the vertical interpolator 5 can be simplified in the arrangement by the same manner.

The modification shown in FIG. 14 has an advantage that the horizontal interpolation factor generator 3 and the vertical interpolation factor generator 6 in the image size changing apparatus need not to calculate the fraction of image data after the decimal point and can thus be simplified in the overall arrangement.

As described above, the present invention has the following advantages.

The first advantage is to eliminate the use of a low-pass filter for suppressing a high frequency component of the data of one field of the original image during the process of changing the size of its image signal and successfully decrease the overall dimensions of the apparatus.

The reason is the installation of the interpolating means for interpolating the input image signal with interpolation factors determined by the correlation between the pixel data of one field of the original image and the pixel data of its size changed image thus to suppress a high frequency component of the input image signal.

The second advantage is minimum probability of causing non-uniformity or shortage of the ratio of data between pixels of the size changed image, hence allowing the size changed image to be rarely declined in the quality.

The reason is the use of the interpolation factors calculated from the ratio between the visual area determined by the pixel data of the original image and the visual area determined by the pixel data of its size changed image.

What is claimed is:

1. An image size changing method for changing the size of an original image according to a size change rate and producing a resultant size changed image, comprising the steps of:
   a) generating horizontal interpolation factors including at least factors hw1, hw2 and hw3 and vertical interpolation factors including at least vw1, vw2 and vw3 from the size change rate; and
   b) interpolating the original image with the interpolation factors to develop the size changed image, wherein
   c) the interpolation factor generating step is arranged for calculating the interpolation factors having a ratio between a visual area determined by pixel data of the original image and a visual area determined by pixel data of its size changed image; and
   d) wherein generating the horizontal interpolation factors includes generating the horizontal interpolation factors at a timing of a clock signal having a frequency which is two times greater than that of a pixel clock signal;
   e) wherein generating the vertical interpolation factors includes generating said vertical interpolation factors at a timing of a horizontal sync signal; and
   f) wherein said the step of interpolating the original image with the interpolation factors includes, for a horizontal interpolation:
   g) providing a first delay circuit and delaying an input image signal thereto by one pixel period in said first delay circuit;
   h) providing a second delay circuit and delaying an input signal thereto, which is an output of said first delay circuit, by another one pixel period;
   i) multiplying an output of said input image signal, an output of said first delay circuit and an output of said second delay circuit with said horizontal interpolation factors, hw1, hw2 and hw3 respectively;
   j) adding the results of said multiplying step i), and
   k) multiplying the results of the addition in step j) by a size change ratio signal ha having a value greater than zero and less than or equal to 2.

2. The image size changing method according to claim 1, wherein the interpolation factor generating steps is arranged for, when the size change rate is a horizontal size change rate of the sized changed image to the original image, generating from the horizontal size change rate the interpolation factors having a horizontal ratio between a visual area determined by pixel data of the original image and a visual area determined by pixel data of its size changed image.

3. The image size changing method according to claim 1, wherein the interpolation factor generating steps is arranged for, when the size change rate is a vertical size change rate of the sized changed image to the original image, generating from the vertical size change rate the interpolation factors having a vertical ratio between a visual area determined by pixel data of the original image and a visual area determined by pixel data of its size changed image.

4. An image size changing apparatus for changing the size of an original image according to a size change rate and producing a resultant size changed image, comprising:
   an interpolation factor generating means for generating interpolation factors from the size change rate, said interpolating factor generating means generating horizontal interpolation factors including at least factors hw1, hw2 and hw3 and vertical interpolation factors including at least vw1, vw2 and vw3; and
   an interpolating means for interpolating the original image with the interpolation factors to develop the size changed image, wherein
   the interpolation factor generating means is arranged for calculating the interpolation factors having a ratio between a visual area determined by pixel data of the original image and a visual area determined by pixel data of its size changed image;
   wherein the horizontal interpolation factors are generated at a timing of a clock signal having a frequency which is two times greater than that of a pixel clock signal; and
   wherein said vertical interpolation factors are generated at a timing of a horizontal sync signal;
   wherein said interpolating means includes for a horizontal interpolation:
   a first delay circuit for delaying an input image signal thereto by one pixel period;

a second delay circuit for delaying an input signal thereto, which is an output of said first delay circuit, by another one pixel period;

first multiplying means for multiplying an output of said input image signal, an output of said first delay circuit and an output of said second delay circuit with said horizontal interpolation factors, hw1, hw2 and hw3;

a first adder for adding the results of said multiplying performed by said first multiplying means, and a first result multiplier for multiplying the results of the addition in said first adder by a size change ratio signal ha having a value greater than zero and less than or equal to 2.

5. The image size changing apparatus according to claim 4, wherein the interpolation factor generating means is arranged for, when the size change rate is a horizontal size change rate of the sized changed image to the original image, generating from the horizontal size change rate the interpolation factors having a horizontal ratio between a visual area determined by pixel data of the original image and a visual area determined by pixel data of its size changed image.

6. The image size changing apparatus according to claim 4, wherein the interpolation factor generating means is arranged for, when the size change rate is a vertical size change rate of the sized changed image to the original image, generating from the vertical size change rate the interpolation factors having a vertical ratio between a visual area determined by pixel data of the original image and a visual area determined by pixel data of its size changed image.

7. The image size changing method according to claim 1, l) wherein said the step of interpolating the original image with the interpolation factors further includes for a vertical interpolation:

m) providing a first line memory circuit and delaying an input image signal thereto by one pixel period in said first line memory circuit;

n) providing a second line memory circuit and delaying an input signal thereto, which is an output of said first line memory circuit, by another one pixel period;

o) multiplying an output of said input image signal, an output of said first line memory circuit and an output of said second line memory circuit with said vertical interpolation factors, vw1, vw2 and vw3;

p) adding the results of said multiplying step o), and q) multiplying the results of the addition in step p) by a size change ratio signal va having a value greater than zero and less than or equal to 1.

8. The An image size changing apparatus according to claim 4 wherein said interpolating means includes for a vertical interpolation:

a first line memory circuit for delaying said input image signal thereto by one pixel period;

a second line memory circuit for delaying an input signal thereto, which is an output of said first line memory circuit, by another one pixel period;

second multiplying means for multiplying an output of said input image signal, an output of said first delay circuit and an output of said second delay circuit with said vertical interpolation factors, vw1, vw2 and vw3;

a second adder for adding the results of said multiplying performed by said second multiplying means, and a second result multiplier for multiplying the results of the addition in said second adder by a size change ratio signal va having a value greater than zero and less than or equal to 1.

* * * * *